United States Patent [19]
Hess

[11] 3,793,080
[45] Feb. 19, 1974

[54] SEALED PRIMARY SODIUM-HALOGEN BATTERY WITH BROMINE-IODINE MIXTURE

[75] Inventor: Heinrich J. Hess, Schenectady, N.Y.

[73] Assignee: General Electric Company, Schenectady, N.Y.

[22] Filed: Jan. 10, 1972

[21] Appl. No.: 216,427

[52] U.S. Cl. .............................. 136/83, 136/86 A
[51] Int. Cl. .................... H01m 15/04, H01m 27/16
[58] Field of Search ............ 136/83, 86 A, 137, 155

[56] References Cited
UNITED STATES PATENTS

| | | | |
|---|---|---|---|
| 3,134,698 | 5/1964 | Neipect et al. | 136/83 R |
| 3,373,058 | 3/1968 | Bloch | 136/83 R |
| 3,404,036 | 10/1968 | Kummer et al. | 136/86 A |
| 3,408,232 | 10/1968 | Blue et al. | 136/86 A |
| 3,421,994 | 1/1969 | LeDuc | 136/86 A |
| 3,455,744 | 7/1969 | Werth et al. | 136/86 A |
| 3,607,417 | 9/1971 | McRae | 136/86 A |

Primary Examiner—A. B. Curtis
Assistant Examiner—H. A. Feeley
Attorney, Agent, or Firm—Paul R. Webb, II; Joseph T. Cohen; Jerome C. Squillaro

[57] ABSTRACT

A sealed primary sodium-halogen battery is disclosed which comprises a casing, an anode positioned in the casing, the anode selected from the class consisting of sodium, sodium as an amalgam, and sodium in a non-aqueous organic electrolyte, a solid sodium crystalline ion-conductive electrolyte positioned in the casing adjacent the anode, and a cathode positioned adjacent the opposite side of the electrolyte, the cathode comprising a mixture of bromine and iodine with from 5 to 60 weight percent of iodine with electronically conductive material selected from the class consisting of porous matrix material, dissolved small amounts of specific additives, and combinations of such materials and additives.

5 Claims, 1 Drawing Figure

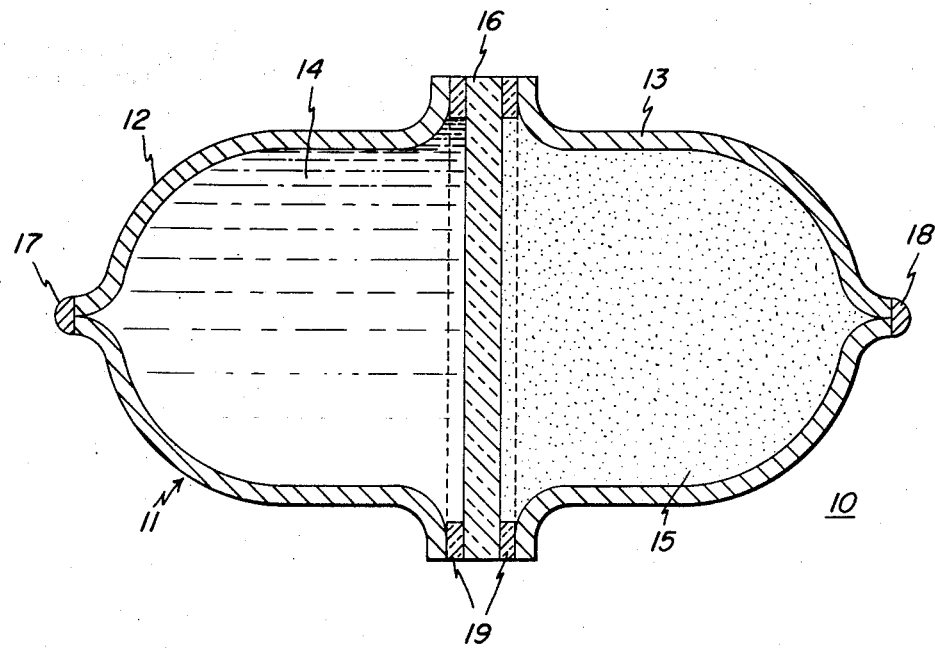

SEALED PRIMARY SODIUM-HALOGEN BATTERY WITH BROMINE-IODINE MIXTURE

This invention relates to sealed primary sodium-halogen batteries and, more particularly, to such batteries employing a cathode of a bromine-iodine mixture in conductive material.

Sodium-sulfur cells, which operate at elevated temperatures, are known in the prior art as, for example, described in Kummer et al, U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

Sodium amalgam-oxygen fuel cells are known in the prior art as, for example, described in Eidensohn U.S. Pat. No. 3,057,946 issued Oct. 9, 1962 under the title "Fuel Cell System." A sodium amalgam is flowed over the face of a metallic plate within an aqueous solution of sodium hydroxide to provide the anode.

Batteries employing alkali metals for the negative and halogens for the positive electrode offer the advantages of high cell voltage and large energy density. Spontaneous reaction of the alkali metals with water has so far precluded the use of aqueous electrolytes in batteries of this type. Stable organic solvents have been used in the past to cope with the problem of solvent decomposition. Another problem relates to the direct chemical reaction between the halogen and the alkali metal. Various separators have been used to slow down this unwanted chemical reaction. However, all of these separators permit a finite rate of permeation of the halogens, and hence, an undesirable self-discharge of the battery is unavoidable.

My present invention is directed to overcoming the above problems by providing a primary sodium halogen battery operable at temperatures of 0° C to 70° C which eliminates an aqueous electrolyte and separation permeation. The bromine-iodine mixture, a stable inorganic system, provides increased solubility for sodium bromide, the reactant, which pure bromine does not, thereby preventing solid sodium bromide formation which impedes reaction rate.

The primary object of my invention is to provide a primary battery which has a zero discharge rate, high cell voltage and high energy density.

In accordance with one aspect of my invention, a sealed primary sodium-halogen battery comprises a casing, an anode positioned in the casing, the anode selected from the class consisting of sodium, sodium as an amalgam, and sodium in a nonaqueous electrolyte, a solid sodium ion-conductive electrolyte positioned in the casing adjacent the anode, and a cathode positioned adjacent the opposite side of the electrolyte, the cathode comprising a mixture of bromine and iodine with from 5 to 60 weight percent of iodine in electronically conductive material selected from the class consisting of porous matrix material, dissolved small amounts of specific additives, and combinations of such material and additives.

These and various other objects, features and advantages of the invention will be better understood from the following description taken in connection with the accompanying drawing in which:

The single FIGURE is a sectional view of a battery made in accordance with my invention.

In the single FIGURE of the drawing, there is shown generally at 10 a sealed primary sodium-halogen battery embodying my invention which has a metallic casing 11 including an anode portion 12 and a cathode portion 13. An anode 14 of sodium as an amalgam is shown positioned within anode portion 12. A cathode 15 comprising a mixture of bromine and iodine with from 5 to 60 weight percent of iodine in conductive material is positioned within cathode portion 13. A solid sodium ion-conductive electrolyte 16 is positioned between and adjacent anode 14 and cathode 15. An electrical lead (not shown) is affixed to the respective casing portions. Closed fill tubes 17 and 18 are associated with the respective portions 12 and 13. Electrolyte 16 is secured on opposite sides to portions 12 and 13 by identical glass seals 19.

I found that I could form a sealed primary sodium-bromine battery by providing a metallic casing, providing an anode within the casing, the anode selected from the class consisting of sodium, sodium as an amalgam, and sodium in a nonaqueous organic electrolyte, providing a solid sodium ion-conductive electrolyte adjacent the anode, and providing a cathode adjacent the opposite side of the electrolyte, the cathode comprising a mixture of bromine and iodine with from 5 to 60 weight percent of iodine in conductive material. With the above range of 5 to 60 weight percent of iodine, I prefer a range of 10–20 weight percent of iodine. I found that such batteries have an open circuit voltage of 3.0 to 3.8 volts, specific energy values between 150 and 180 watt hours per pound (wh/lb), and energy densities between 15 and 18 watt hours per cubic inch (wh/in$^3$).

I found that the anode may consist of sodium, a sodium amalgam or sodium in a nonaqueous organic solvent. The sodium amalgam can be in the range of compositions from about 95 percent sodium and 5 percent mercury by weight to about 35 percent sodium and 65 percent mercury. For the fully charged state of the cell, the amalgam composition is preferably high in sodium. Cells using sodium amalgams cannot be used efficiently at temperatures below 21.5° C due to complete freezing of the amalgam.

The use of organic electrolytes permits cell operation to much lower temperatures as determined by the freezing point of the organic electrolyte. A preferred organic electrolyte is propylene carbonate in which a sodium halide salt is dissolved. This electrolyte permits cell operation down to 0° C.

The cathode comprises a mixture of bromine and iodine with from 5 to 60 weight percent of iodine in electronically conductive material, such as an electronically conducting porous matrix of carbon felt or foam metal with electronically conductive material of dissolved small amounts of additives, such as NaCl, NaBr, KCl, AlCl$_3$, AlBr$_3$, POCl$_3$, etc., or a combination of both types of materials.

I found further that the anode casing portion can be made of nickel, Kovar alloy, niobium or tantalum, while the cathode casing portion should preferably be niobium or tantalum. These metals have been shown to be chemically stable in their respective environments.

A unique method of hermetically sealing the anode and cathode portions of the casing to opposite sides of the solid electrolyte is described and claimed in copending patent application Ser. No. 148,793, filed June 1, 1971, under the title "Method of Forming a Metallic Battery Casing" in the name of Stephan P. Mitoff. This copending application is assigned to the same assignee as the present application.

In the above method, a disc of solid sodium ion-conductive electrolyte, for example, sodium beta-alumina, has stacked thereon a ring of General Electric Company 1013 glass cut from tubing. The glass ring has approximately the inside and outside diameter of the cup lip of casing portion. On the glass ring is stacked the nickel anode portion in cup form with its lip adjacent the ring. The three components are positioned on a supporting jig and lowered into an inert atmosphere furnace at 1,000° C for about one minute. The resulting seal is helium leaktight. The process is repeated to seal the cathode portion to the opposite surface of the solid electrolyte. This sealing method was unexpected since previous attempts using powdered solder glasses were unsuccessful. Both anode and cathode portions can also be sealed simultaneously to the disc in the above manner. An electronically conductive matrix is placed in the cathode portion before sealing.

I found the anode portion can be filled with sodium, sodium as an amalgam or sodium in a nonaqueous organic electrolyte through tube 17 after which the tube is sealed, as for example, by welding. The cathode portion is filled with a mixture of bromine and iodine with from 5 to 60 weight percent of iodine through tube 18, after which the tube is similarly sealed. The resulting device is a sealed, secondary sodium-halogen battery. Leads (not shown) are attached to the respective casing portions for operation of the battery.

Examples of sealed primary sodium-halogen batteries made in accordance with my invention are set forth below:

EXAMPLE 1

A battery was constructed generally in accordance with the above description and with the single FIGURE of the drawing wherein a metallic casing having a nickel portion and a niobium portion was provided. Each casing portion was in the form of a cup with a lip and a tube extending from the closed surface. A solid sodium ion-conductive electrolyte was provided in the form of a disc of sodium beta-alumina. A glass ring with approximately the inside and outside diameter of the cup lip was cut from General Electric Company 1013 glass tubing. The electrolyte disc, glass ring and lip of the anode portion were stacked together on a jig which was lowered into a furnace at 1,000° C for about 1 minute. The resulting seal was tested and found to be helium leak-tight. A similar glass ring and the lip of the cathode portion were positioned in that respective order, after inserting a carbon felt matrix, on the opposite side of the electrolyte disc which components were stacked together on a jig after which the structure was lowered into a furnace at 1,000° C for about 1 minute. The second seal was found to be helium leak-tight.

The anode portion was then filled through its full tube with a sodium amalgam of a composition of 90 weight percent of sodium and 10 weight percent of mercury. The end of the fill tube was then sealed by welding. A mixture of bromine and 10 weight percent iodine was added through the other fill tube to the cathode portion. This fill tube was then sealed at its end by welding. The resulting device was a sealed primary sodium-halogen battery. An open circuit voltage of 3.4 volts was obtained.

EXAMPLE 2

The battery of Example 1 has been discharging at a current of 30 microamperes for a period of several months at a constant discharge voltage above 3.0 volts.

EXAMPLE 3

A battery was constructed as described above in Example 1 but no carbon felt matrix was employed in the cathode portion. The cathode portion was filled with a mixture of bromine and iodine with 15 weight percent of iodine and 5 weight percent of an additive of $AlBr_3$. An open circuit voltage of 3.80 volts and a short circuit current of 350 microamperes per square centimeter was measured.

EXAMPLE 4

A battery was constructed as described above in Example 1 but its anode portion was filled with sodium amalgam of a composition of 70 weight percent sodium and 30 weight percent of mercury. Initially, an open circuit voltage of 3.4 volts was measured. This battery has been discharging for several weeks at a current of 300 microamperes. At about 20 percent depth of discharge, the open circuit voltage was still at 3.3 volts.

While other modifications of the invention and variations thereof which may be employed within the scope of the invention have not been described, the invention is intended to include such as may be embraced within the following claims.

What I claim as new and desire to secure by letters Patent of the United States is:

1. A hermetically sealed primary sodium-halogen battery comprising a metallic casing including an anode and cathode portions, an anode positioned in said anode portion, the anode selected from the class consisting of sodium, sodium as an amalgam, and sodium in a nonaqueous organic electrolyte, a solid sodium beta-alumina ion-conductive electrolyte positioned in the casing adjacent the anode, and a cathode positioned adjacent the opposite side of the electrolyte in said cathode portion, the cathode comprising a mixture of bromine and iodine with from 5 to 60 weight percent of iodine with electronically conductive material selected from the class consisting of porous electrically conductive matrix material, dissolved small amounts of specific additives selected from the class consisting of $NaCl$, $NaBr$, $KCl$, $AlCl_3$, $AlBr_3$ and $POCl_3$, and combinations of such material and additives.

2. In a sealed primary sodium-halogen battery as in claim 1, in which 10 to 20 weight percent of iodine is contained in the mixture of bromine and iodine.

3. In a sealed primary sodium-halogen battery as in claim 1, in which the electronically conductive material of the cathode is carbon felt.

4. In a sealed primary sodium-halogen battery as in claim 1, in which the electronically conductive material of the cathode is foam metal.

5. In a sealed primary sodium-halogen battery as in claim 1, in which the casing has an anode portion and a cathode portion, the anode portion consisting of a metal selected from the class consisting of nickel, Kovar alloy, niobium and tantalum, the cathode portion consisting of a metal selected from the class consisting of niobium and tantalum, and the solid electrolyte sealed to the anode portion and the cathode portion by glass seals.

* * * * *